United States Patent
Lien et al.

(10) Patent No.: US 12,323,302 B2
(45) Date of Patent: Jun. 3, 2025

(54) TOPOLOGY PATH OBTAINING METHOD OF MESH NETWORK AND SYSTEM THEREOF

(71) Applicant: Wistron NeWeb Corporation, Hsinchu (TW)

(72) Inventors: Chia-Yi Lien, Hsinchu (TW); Chih-Wei Chung, Hsinchu (TW); Hao-Ming Liang, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 444 days.

(21) Appl. No.: 17/817,157

(22) Filed: Aug. 3, 2022

(65) Prior Publication Data

US 2023/0198849 A1 Jun. 22, 2023

(30) Foreign Application Priority Data

Dec. 22, 2021 (TW) ................. 110148265

(51) Int. Cl.

| | |
|---|---|
| *H04L 41/12* | (2022.01) |
| *H04L 41/0806* | (2022.01) |
| *H04W 24/02* | (2009.01) |
| *H04W 40/24* | (2009.01) |
| *H04W 48/20* | (2009.01) |
| *H04W 76/11* | (2018.01) |
| *H04W 76/16* | (2018.01) |

(Continued)

(52) U.S. Cl.
CPC .......... *H04L 41/12* (2013.01); *H04L 41/0806* (2013.01); *H04W 24/02* (2013.01); *H04W 40/246* (2013.01); *H04W 48/20* (2013.01); *H04W 76/11* (2018.02); *H04W 76/16* (2018.02); *H04W 84/12* (2013.01); *H04W 84/22* (2013.01)

(58) Field of Classification Search
CPC .... H04L 41/12; H04L 41/0806; H04W 76/11; H04W 76/16; H04W 24/02; H04W 40/246; H04W 48/20; H04W 84/12; H04W 84/22

See application file for complete search history.

(56) References Cited

U.S. PATENT DOCUMENTS

| | | | |
|---|---|---|---|
| 10,644,960 B2* | 5/2020 | Lien ................ | H04B 17/21 |
| 2009/0109855 A1* | 4/2009 | Gong ............... | H04W 16/10 |
| | | | 370/465 |

(Continued)

*Primary Examiner* — Sujoy K Kundu
*Assistant Examiner* — Weibin Huang
(74) *Attorney, Agent, or Firm* — McClure, Qualey & Rodack, LLP

(57) ABSTRACT

A topology path obtaining method of a mesh network and a system configured to obtain a topology path of the mesh network are provided. In the method, a topology query packet transmitting step is performed to configure a root access point to transmit a topology query packet to a plurality of extended access points. A topology response packet transmitting step is performed to configure each of the extended access points to transmit a first topology response packet to the root access point according to the topology query packet. A topology path generating step is performed to configure the root access point to collect and process a plurality of the first topology response packets and a second topology response packet to generate the topology path. The topology path includes a connection relationship between at least one client device and one of the root access point and the extended access points.

18 Claims, 7 Drawing Sheets

(51) Int. Cl.
*H04W 84/12* (2009.01)
*H04W 84/22* (2009.01)

(56) References Cited

U.S. PATENT DOCUMENTS

| | | | |
|---|---|---|---|
| 2018/0302832 A1* | 10/2018 | Huang | H04L 45/124 |
| 2020/0128610 A1* | 4/2020 | Cheng | H04W 76/15 |
| 2021/0120454 A1* | 4/2021 | Chennichetty | H04B 7/0452 |
| 2022/0272614 A1* | 8/2022 | Lu | H04W 48/16 |
| 2023/0144370 A1* | 5/2023 | Tseng | H04W 40/04 |
| | | | 370/329 |

\* cited by examiner

TOPOLOGY PATH OBTAINING METHOD OF MESH NETWORK AND SYSTEM THEREOF

RELATED APPLICATIONS

This application claims priority to Taiwan Application Serial Number 110148265, filed Dec. 22, 2021, which is herein incorporated by reference.

BACKGROUND

Technical Field

The present disclosure relates to an obtaining method of a connection relationship between networks and a system thereof. More particularly, the present disclosure relates to a topology path obtaining method of a mesh network and a system thereof.

Description of Related Art

Wi-Fi and Ethernet are the main communication technologies that people usually use to surf the Internet. A mesh network is a method to transmit data and the controlling commands between network nodes through dynamic routing. The mesh network can include a plurality of access points and a plurality of clients. The access points can be connected to each other through a wireless network or wired Ethernet. The clients can be divided into a wireless network client and an Ethernet client, which represent connecting to the access points by using the Wi-Fi interface and the Ethernet interface, respectively. In addition, the access points can be divided into a root access point (RootAP) and an extended access point (Extender AP).

The Easymesh standard issued by the Wi-Fi Alliance defines a topology query message, a topology response message and a topology notification message. However, the format of the aforementioned messages only considers the information of the wireless network client, and does not consider the information of the Ethernet client. Since the topology map of the mesh network constructed by only collecting the aforementioned messages is incomplete, the debugging is complicated and cumbersome in such network environment, and it is difficult for the user to understand the connection relationship between the client devices.

In view of this, how to establish a method and a system that can obtain the connection relationship between the access points and the client devices in the mesh network and make the topology more complete are indeed highly anticipated by the public and become the goal and the direction of relevant industry efforts.

SUMMARY

According to one aspect of the present disclosure, a topology path obtaining method of a mesh network is configured to obtain a topology path of the mesh network. The mesh network includes a root access point, a plurality of extended access points and at least one client device. The topology path obtaining method of the mesh network includes performing a topology query packet transmitting step, a topology response packet transmitting step and a topology path generating step. The topology query packet transmitting step is performed to configure the root access point to transmit a topology query packet to the extended access points. The topology response packet transmitting step is performed to configure each of the extended access points to transmit a first topology response packet to the root access point according to the topology query packet, and configure the root access point to generate a second topology response packet. The topology path generating step is performed to configure the root access point to collect and process a plurality of the first topology response packets of the extended access points and the second topology response packet to generate the topology path. The topology path includes a connection relationship between the at least one client device and one of the root access point and the extended access points.

According to another aspect of the present disclosure, a topology path obtaining system of a mesh network is configured to obtain a topology path of the mesh network. The topology path obtaining system of the mesh network includes a root access point, a plurality of extended access points and at least one client device. The root access point transmits a topology query packet. The extended access points are connected to the root access point and receive the topology query packet. Each of the extended access points transmits a first topology response packet to the root access point according to the topology query packet, and the root access point generates a second topology response packet. The at least one client device is connected to one of the root access point and the extended access points. The root access point collects and processes a plurality of the first topology response packets of the extended access points and the second topology response packet to generate the topology path, and the topology path includes a connection relationship between the at least one client device and one of the root access point and the extended access points.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected to" another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
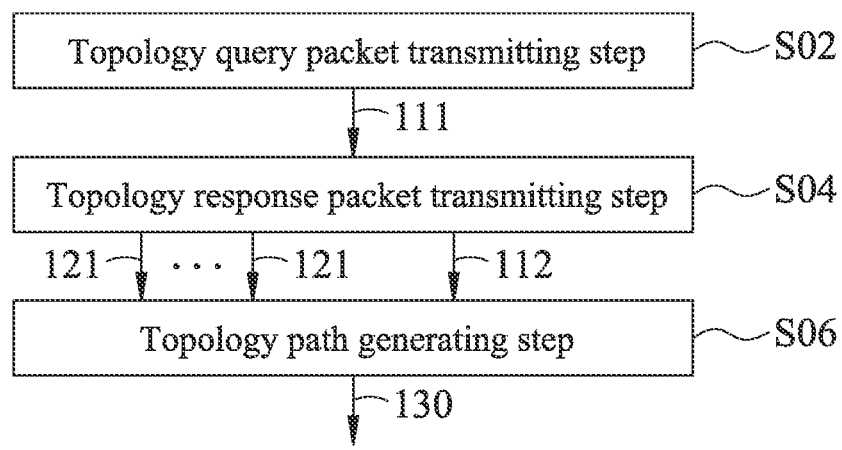
FIG. 1 shows a flow chart of a topology path obtaining method of a mesh network according to a first embodiment of the present disclosure.

Please refer to FIG. 1. FIG. 1 shows a flow chart of a topology path obtaining method 100 of a mesh network according to a first embodiment of the present disclosure. As shown in FIG. 1, the topology path obtaining method 100 of the mesh network includes performing a topology query packet transmitting step S02, a topology response packet transmitting step S04 and a topology path generating step S06, and is configured to obtain a topology path 130 of the mesh network via the above steps. The mesh network includes a root access point, a plurality of extended access points and at least one client device.

The topology query packet transmitting step S02 is performed to configure the root access point to transmit a topology query packet 111 to the extended access points, that is, the root access point multicasts the topology query packet 111 to each of the extended access points.

The topology response packet transmitting step S04 is performed to configure each of the extended access points to transmit a first topology response packet 121 to the root access point according to the topology query packet 111. In other words, after receiving the topology query packet 111 multicast by the root access point, each of the extended access point unicasts the first topology response packet 121 to the root access point. In addition, the root access point generates a second topology response packet 112 by itself during the topology response packet transmitting step S04.

The topology path generating step S06 is performed to configure the root access point to collect and process a plurality of the first topology response packets 121 of the extended access points and the second topology response packet 112 to generate the topology path 130. The topology path 130 includes a connection relationship between the at least one client device and one of the root access point and the extended access points. In other embodiments, each of the root access point and the extended access points multicast the topology query packet to other access points, and receive the topology response packets from the other access points, so the present disclosure is not limited to only using the root access point to collect and process the packets.

Therefore, the topology path obtaining method 100 of the mesh network of the present disclosure obtains the topology path 130 by analyzing the messages of the first topology response packets 121 and the second topology response packet 112, and uses the topology path 130 to understand that the at least one client device is connected to the root access point or to one of the extended access points in the topology of the mesh network.

Figure 2:
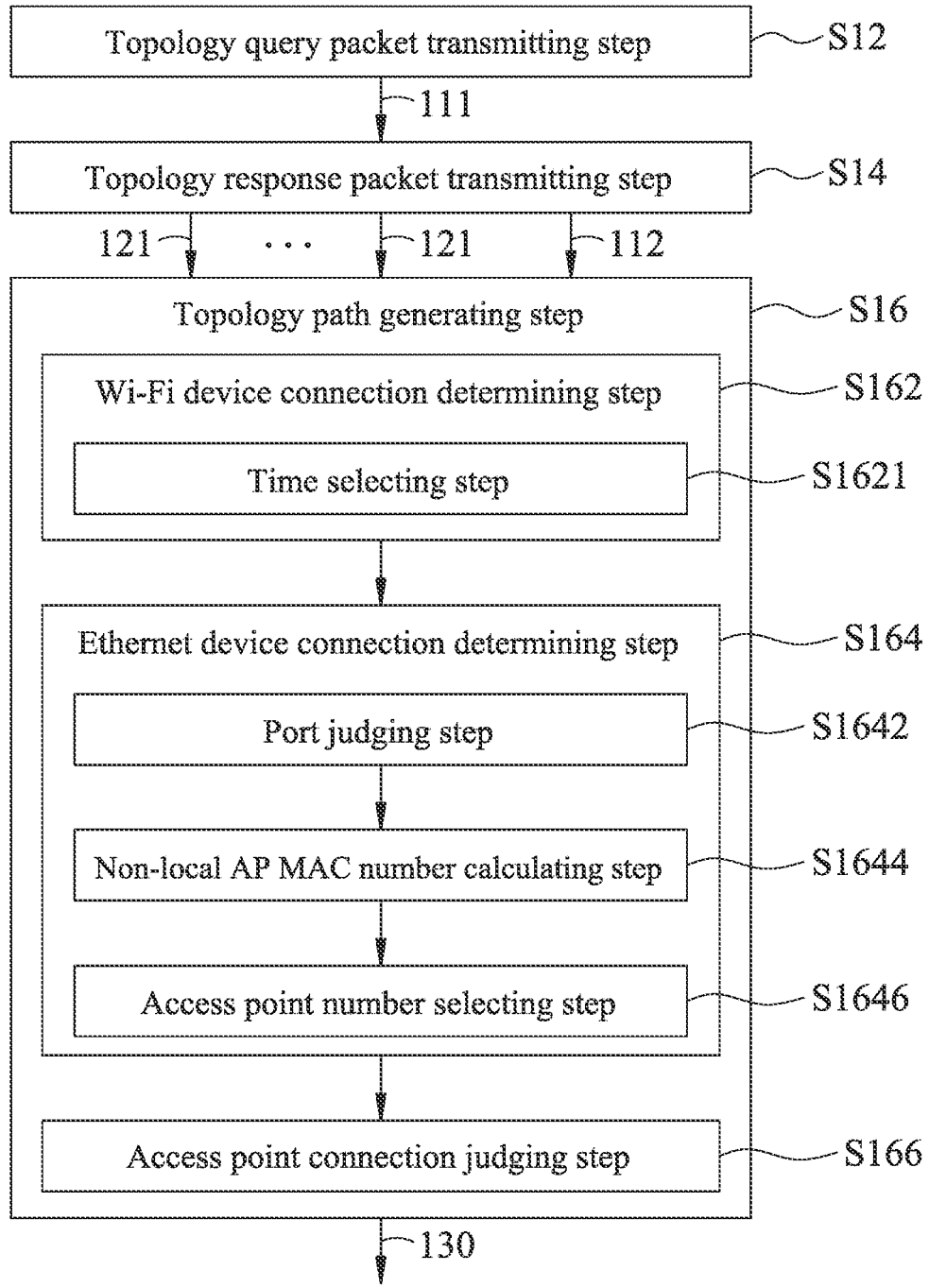
FIG. 2 shows a flow chart of a topology path obtaining method of a mesh network according to a second embodiment of the present disclosure.
Figure 3:
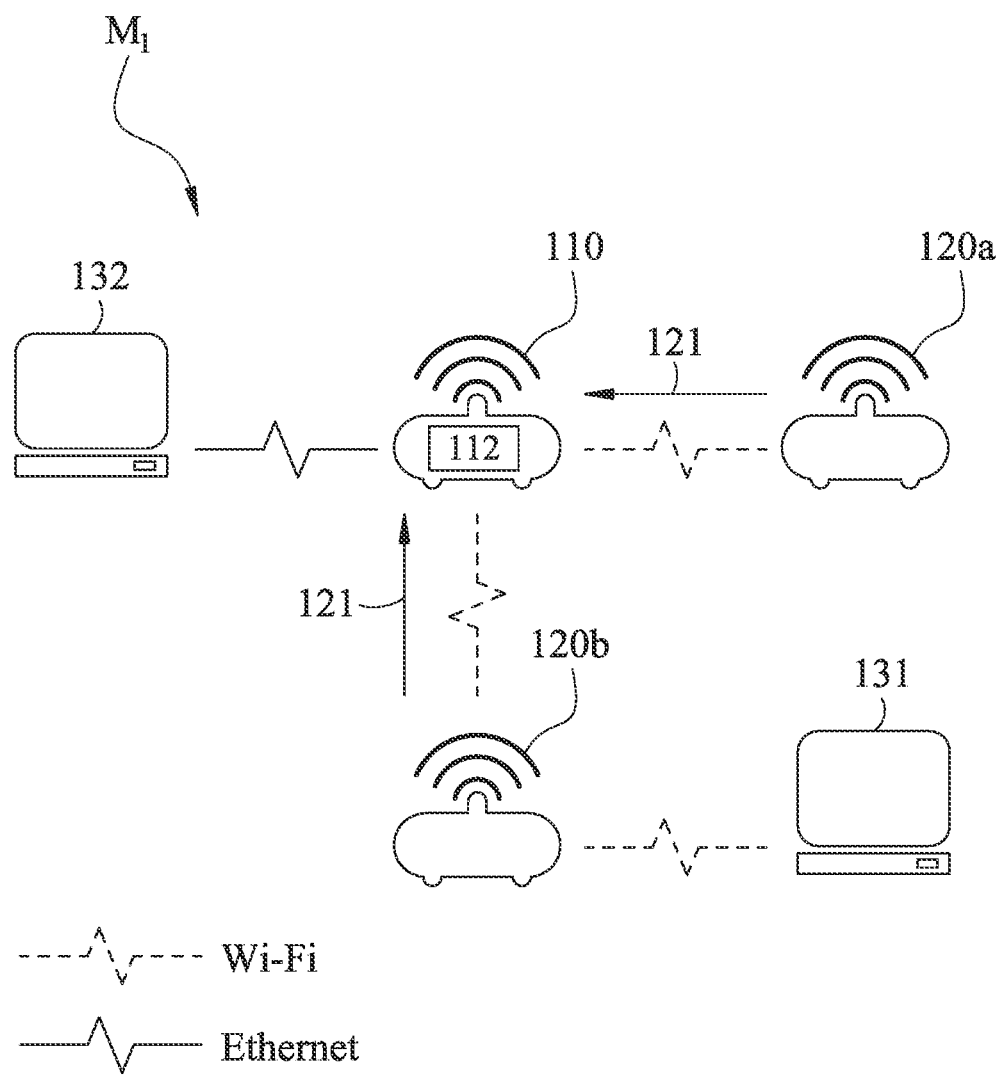
FIG. 3 is a schematic view of the mesh network of the second embodiment of the present disclosure.

Please refer to FIGS. 2 and 3. FIG. 2 shows a flow chart of a topology path obtaining method 200 of a mesh network $M_1$ according to a second embodiment of the present disclosure. FIG. 3 is a schematic view of the mesh network $M_1$ of the second embodiment of the present disclosure. As shown in FIGS. 2 and 3, the topology path obtaining method 200 of the mesh network $M_1$ includes performing a topology query packet transmitting step S12, a topology response packet transmitting step S14 and a topology path generating step S16. Both of the topology query packet transmitting step S12 and the topology response packet transmitting step S14 are the same as the corresponding steps in the first embodiment, and are not described again herein.

The difference between the second embodiment and the first embodiment is that the topology path generating step S16 can include performing a Wi-Fi device connection determining step S162, an Ethernet device connection determining step S164 and an access point connection judging step S166. Specifically, the mesh network $M_1$ of the second embodiment can include a plurality of access points and at least one client device. The access points are composed of a root access point 110 and two extended access points 120a, 120b. The root access point 110 is configured to analyze a plurality of topology response packets, and the topology response packets are composed of the two first topology response packets 121 generated by the two extended access points 120a, 120b and the second topology response packet 112 generated by the root access point 110. A number of at least one client device is two, and the two client devices are a Wi-Fi device 131 and an Ethernet device 132, respectively. In other embodiments, the number of at least one client device can be plural, and the present disclosure is not limited to the number of at least one client device.

The Wi-Fi device connection determining step S162 is performed to configure the root access point 110 to determine that the Wi-Fi device 131 is connected to one of the root access point 110 and the extended access points 120a, 120b according to the two first topology response packets 121 of the extended access points 120a, 120b and the second topology response packet 112 of the root access point 110. In detail, each of the first topology response packets 121 and the second topology response packet 112 includes a topology response message defined in the Easymesh standard, which is configured to let the root access point 110 know that which of the access points the Wi-Fi device 131 is connected to. Therefore, the root access point 110 determines that the Wi-Fi device 131 is connected to the extended access point 120b according to the topology response message of the first topology response packet 121 unicast by the extended access point 120b, and then generates the topology path 130.

It should be noted that when the Wi-Fi device 131 is disconnected, the second topology response packet 112 of the root access point 110 or the first topology response packet 121 of the extended access point 120a can still contain a topology response message that the Wi-Fi device 131 is still connected to the root access point 110 or the extended access point 120a, because the Wi-Fi device 131 does not return a disconnected message to the root access point 110 or the extended access point 120a. In order to solve the aforementioned problems, each of the first topology response packets 121 of the present disclosure can further include a first associate time corresponding to the Wi-Fi device 131, and the second topology response packet 112 can further include a second associate time corresponding to the Wi-Fi device 131.

Further, the Wi-Fi device connection determining step S162 can include performing a time selecting step S1621. The time selecting step S1621 is performed to configure the root access point 110 to select one of the root access point 110 and the extended access points 120a, 120b having a minimum value from the two first associate times of the first topology response packets 121 and the second associate time, and the root access point 110 determines that the Wi-Fi device 131 is connected to the one of the root access point 110 and the extended access points 120a, 120b having the minimum value. For example, the Wi-Fi device 131 was connected to the extended access point 120a few seconds ago and is disconnected now, the extended access point 120a records the first associate time (e.g., 120 seconds) in the first topology response packet 121. Since the Wi-Fi device 131 has never been connected to the root access point 110, the root access point 110 can know that the Wi-Fi device 131 has never connected to itself (i.e., the second associate time is 0 second) through the topology response message of the second topology response packet 112. The Wi-Fi device 131 started to connect to the extended access point 120b few seconds ago, and the extended access point 120b records the first associate time (e.g., 60 seconds) in the another first topology response packet 121. Then, the root access point 110 judges that the first associate time (i.e., 60 seconds) corresponding to the extended access point 120b is the minimum value and determines that the Wi-Fi device 131 is connected to the extended access point 120b corresponding to the first associate time (i.e., 60 seconds), and then the topology path 130 is generated by the root access point 110. That is, according to the time selecting step S1621, the minimum value is the smallest among the associate times of the access points that have a connection relationship with the Wi-Fi device 131; in short, the minimum value among the associate times is represented as 0 second, or the minimum time (seconds).

Moreover, each of the access points can include a plurality of virtual access points (VAP), and each of the topology response packets can include an associate sub-time corresponding to each of the virtual access points. For example, if the two first topology response packets 121 of the two extended access points 120a, 120b have the same first associate time, the root access point 110 can select one of the virtual access points of the two extended access points 120a, 120b having a minimum value from a plurality of the associate sub-times of the two first topology response packets 121, and determine that the Wi-Fi device 131 is connected to the one of the virtual access points of the two extended access points 120a, 120b having the minimum value (that is, the root access point 110 determines that the Wi-Fi device 131 is connected to one of the virtual access points of the extended access point 120a or the extended access point 120b). Similarly, if the first associate time corresponding to the extended access point 120b is the same as the second associate time corresponding to the root access point 110, the root access point 110 can still determine the connection position of the Wi-Fi device 131 through judging the associate sub-times corresponding to the virtual access points of the root access point 110 and the associate sub-times corresponding to the virtual access points of the extended access point 120b. The method of determining the connection position of the Wi-Fi device 131 is similar to the time selecting step S1621, and is not described again herein.

The Ethernet device connection determining step S164 is performed to configure the root access point 110 to determine that the Ethernet device 132 is connected to at least one of the root access point 110 and the extended access points 120a, 120b according to the two first topology response packets 121 of the extended access points 120a, 120b and the second topology response packet 112 of the root access point 110. Specifically, each of the first topology response packets 121 can further include a first non-local Access Point Media Access Control (AP MAC) number, the second topology response packet 112 can further include a second non-local AP MAC number, and the Ethernet device connection determining step S164 can include performing a port judging step S1642, a non-local AP MAC number calculating step S1644 and an access point number selecting step S1646.

It should be noted that the extended access point 120a of the second embodiment can receive the topology response packet from the root access point 110 and the topology response packet from the extended access point 120b, and collect the topology response messages in the aforementioned two topology response packets and the topology response message in its' own topology response packet. The information collected by the extended access point 120a are as listed in Table 1. Table 1 is one part of data in the topology response message.

TABLE 1

| Extended access point 120a | | |
|---|---|---|
| Port | Media access control address | Is the local address? |
| 6 | 00:0b:6b:ee:60:6d | No |
| 5 | 00:0b:6b:ee:60:6f | Yes |
| 6 | 00:0b:6b:ee:64:25 | No |
| 6 | 00:0b:6b:ee:64:28 | No |
| 3 | 00:0b:6b:ee:64:42 | Yes |
| 4 | 00:0b:6b:ee:64:43 | Yes |
| 1 | 00:0b:6b:ee:64:44 | Yes |
| 2 | 00:0b:6b:ee:64:45 | Yes |
| 6 | 06:0b:6b:ee:60:6f | Yes |
| 6 | a8:1e:84:83:39:87 | No |

The extended access point 120b of the second embodiment can receive the topology response packet from the root access point 110 and the topology response packet from the extended access point 120a, and collect the topology response messages in the aforementioned two topology response packets and the topology response message in its' own topology response packet. The information collected by the extended access point 120b are as listed in Table 2. Table 2 is one part of data in the topology response message.

TABLE 2

| Extended access point 120b | | |
|---|---|---|
| Port | Media access control address | Is the local address? |
| 5 | 00:0b:6b:ee:60:6e | Yes |
| 6 | 00:0b:6b:ee:64:25 | No |
| 3 | 00:0b:6b:ee:64:26 | Yes |
| 4 | 00:0b:6b:ee:64:27 | Yes |
| 1 | 00:0b:6b:ee:64:28 | Yes |
| 2 | 00:0b:6b:ee:64:29 | Yes |
| 6 | 00:0b:6b:ee:64:44 | No |
| 6 | 06:0b:6b:ee:60:6e | Yes |
| 3 | 2c:ae:2b:5e:89:4a | No |
| 6 | a8:1e:84:83:39:87 | No |

The root access point 110 collects the topology response message of each of the first topology response packets 121 and the topology response message of the second topology response packet 112. The information collected by the root access point 110 are as listed in Table 3. Table 3 is one part of data in the topology response message.

TABLE 3

Root access point 110

| Port | Media Access Control address | Is the local access point address? |
|---|---|---|
| 4 | 00:0b:6b:ee:60:6d | Yes |
| 2 | 00:0b:6b:ee:64:22 | Yes |
| 3 | 00:0b:6b:ee:64:23 | Yes |
| 1 | 00:0b:6b:ee:64:25 | Yes |
| 4 | 00:0b:6b:ee:64:28 | No |
| 4 | 00:0b:6b:ee:64:44 | No |
| 4 | 2c:ae:2b:5e:89:4a | No |
| 1 | a8:1e:84:83:39:87 | No |

The MAC address of the Ethernet device 132 is "a8:1e:84:83:39:87" in Table 1, Table 2 and Table 3. An Organizationally Unique Identifier (OUI) of each of the extended access points 120a, 120b and the root access point 110 is "00:0b:6b" in Table 1, Table 2 and Table 3. The MAC address of the Wi-Fi device 131 is "2c:ae:2b:5e:89:4a" in Table 2 and Table 3.

The port judging step S1642 is performed to configure the extended access point 120a to judge that the Ethernet device 132 is located at the port 6 in Table 1 according to the MAC address corresponding to the Ethernet device 132, configure the extended access point 120b to judge that the Ethernet device 132 is located at the port 6 in Table 2 according to the MAC address corresponding to the Ethernet device 132, and configure the root access point 110 to judge that the Ethernet device 132 is located at the port 1 in Table 3 according to the MAC address corresponding to the Ethernet device 132.

The non-local AP MAC number calculating step S1644 is performed to configure the extended access point 120a to calculate, according to the port 6 in Table 1, the first non-local AP MAC number of the first topology response packet 121 unicast from the extended access point 120a, configure the extended access point 120b to calculate, according to the port 6 in Table 2, the first non-local AP MAC number of the first topology response packet 121 unicast from the extended access point 120b, and configure the root access point 110 to calculate the second non-local AP MAC number according to the port 1 in Table 3. In detail, the extended access point 120a knows that the Ethernet device 132 is located at the port 6 through Table 1. The extended access point 120a calculates the number of the MAC addresses that are located at port 6 and not local access point addresses. Therefore, the first non-local AP MAC number of the first topology response packet 121 unicast from the extended access point 120a is 3, and so on. In Table 2, the first non-local AP MAC number of the first topology response packet 121 unicast from the extended access point 120b is 2. In Table 3, the second non-local AP MAC number of the second topology response packet 112 is 0.

The access point number selecting step S1646 is performed to configure the root access point 110 to select one of the root access point 110 and the extended access points 120a, 120b having a minimum value from the two first non-local AP MAC numbers (i.e., 3 and 2) of the two first topology response packets 121 and the second non-local AP MAC number (i.e., 0), and determine that the Ethernet device 132 is connected to the one of the root access point 110 and the extended access points 120a, 120b having the minimum value. In other words, since the second non-local AP MAC number (i.e., 0) is the minimum value, the root access point 110 determines that the Ethernet device 132 is connected to the root access point 110 corresponding to the second non-local AP MAC number, and then generates the topology path 130 accordingly. Therefore, the topology path obtaining method 200 of the mesh network $M_1$ of the present disclosure judges that the Ethernet device 132 is located at a port in one of the access points, and if the aforementioned port is connected to fewer other access points, it indicates that the Ethernet device 132 is more likely to be connected to the one of the access points.

In other embodiments, in response to determining that at least two of the first non-local AP MAC numbers and the second non-local AP MAC number are the minimum value (e.g., the two first non-local AP MAC numbers corresponding to the two extended access points are 3 and 0, and the second non-local AP MAC numbers corresponding to the root access point is 0), the root access point determines that the Ethernet device is connected to one of the at least two of the first non-local AP MAC numbers and the second non-local AP MAC number according to hexadecimal characters corresponding to each of the at least two of the first non-local AP MAC numbers and the second non-local AP MAC number. Specifically, the root access point determines the connection position of the Ethernet device according to the access point having the smallest hexadecimal characters. For example, the hexadecimal characters corresponding to the MAC address of the root access point is "00:0b:6b:ee:a8:97". The hexadecimal characters corresponding to the MAC address of the extended access point is "00:0b:6b:ee:a8:ab". Since "0x97" is less than "0xab" in hexadecimal, the root access point determines that the Ethernet device is connected to the root access point.

Furthermore, each of the first topology response packets 121 can further include a first response packet and a second response packet. The extended access point 120a transmits the first response packet to the root access point 110 according to a first time interval, and transmits the second response packet to the root access point 110 according to a second time interval. Similarly, the extended access point 120b transmits the first response packet to the root access point 110 according to the first time interval, and transmits the second response packet to the root access point 110 according to the second time interval.

The access point connection judging step S166 is performed to configure the root access point 110 to judge a network state between each of the extended access points 120a, 120b and the root access point 110 according to whether the first response packet or the second response packet is received by the root access point 110 within the first time interval. In detail, the first response packet can be a topology response packet defined by the IEEE 1905.1 standard, and the second response packet can be a vendor specific topology response packet. The first time interval can be 60 seconds, and the second time interval can be 5 seconds, but the present disclosure is not limited thereto. In response to determining that the first response packet or the second response packet unicast from the extended access point 120a is received by the root access point 110 within the first time interval (i.e., 60 seconds), the root access point 110 judges that the network state of the extended access point 120a is a connected state, which indicates that the extended access point 120a is connected to the root access point 110, and the root access point 110 generates the topology path 130 according to the connected state. On the other hand, in response to determining that neither the first response packet nor the second response packet unicast from the extended access point 120a is received by the root access point 110 within the first time interval (i.e., 60 seconds), the root access point 110 judges that the network state of the extended access point 120a is a disconnected state, which indicates that the extended access point 120a is not connected to the root access point 110, and the root access point 110 generates the topology path 130 according to the disconnected state. Similarly, the root access point 110 can also generate the topology path 130 corresponding to the extended access point 120b through the access point connection judging step S166.

Figure 4:
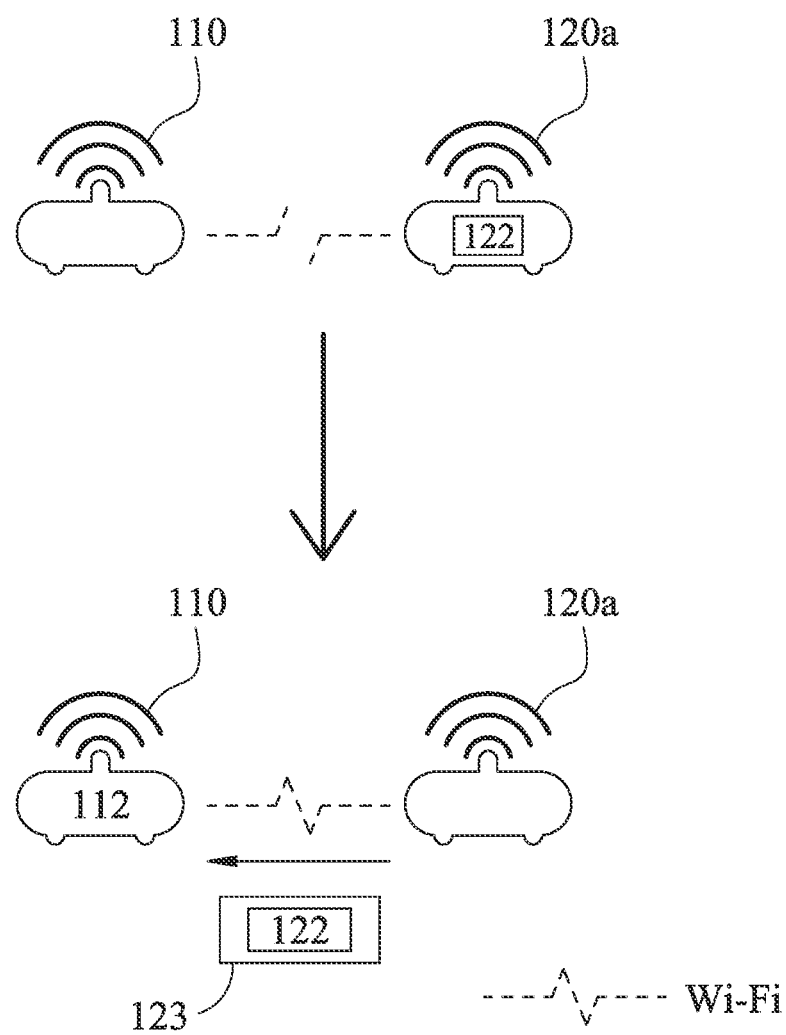
FIG. 4 is a schematic view of an extended access point transitioning from a disconnected state back to a connected state relative to a root access point of FIG. 3.

Please refer to FIGS. 2 and 4. FIG. 4 is a schematic view of the extended access point 120a transitioning from the disconnected state back to the connected state relative to the root access point 110 of FIG. 3. As shown in FIG. 4, in the access point connection judging step S166, when the extended access point 120a is in the disconnected state or about to be disconnected from the root access point 110, the extended access point 120a generates a disconnected reason code 122 and records the disconnected reason code 122 in a log 123. In response to determining that the extended access point 120a is reconnected to the root access point 110 and switches back to the connected state, the extended access point 120a transmits the log 123 containing the disconnected reason code 122 to the root access point 110. In detail, the disconnected reason code 122 can be a reason code defined by the IEEE 802.11 standard, but the present disclosure is not limited thereto. In the practical applications, the disconnection or the topology variations among the access points would cause poor user experience. In addition, it is difficult for operators or users to clarify the disconnected reason for disconnection. When the extended access point 120a performs actions that can cause disconnection, such as resetting Wi-Fi interface, restarting the Wi-Fi interface, rebooting the system, weakening signal and changing connection destination, the extended access point 120a would record the reason for interruption and generate the disconnected reason code 122. The extended access point 120a can report to the root access point 110 or the cloud before disconnected from or after reconnected to the root access point 110, so that the root access point 110 can know the reasons for the disconnection and the topology variation of the extended access point 120a.

Figure 5:
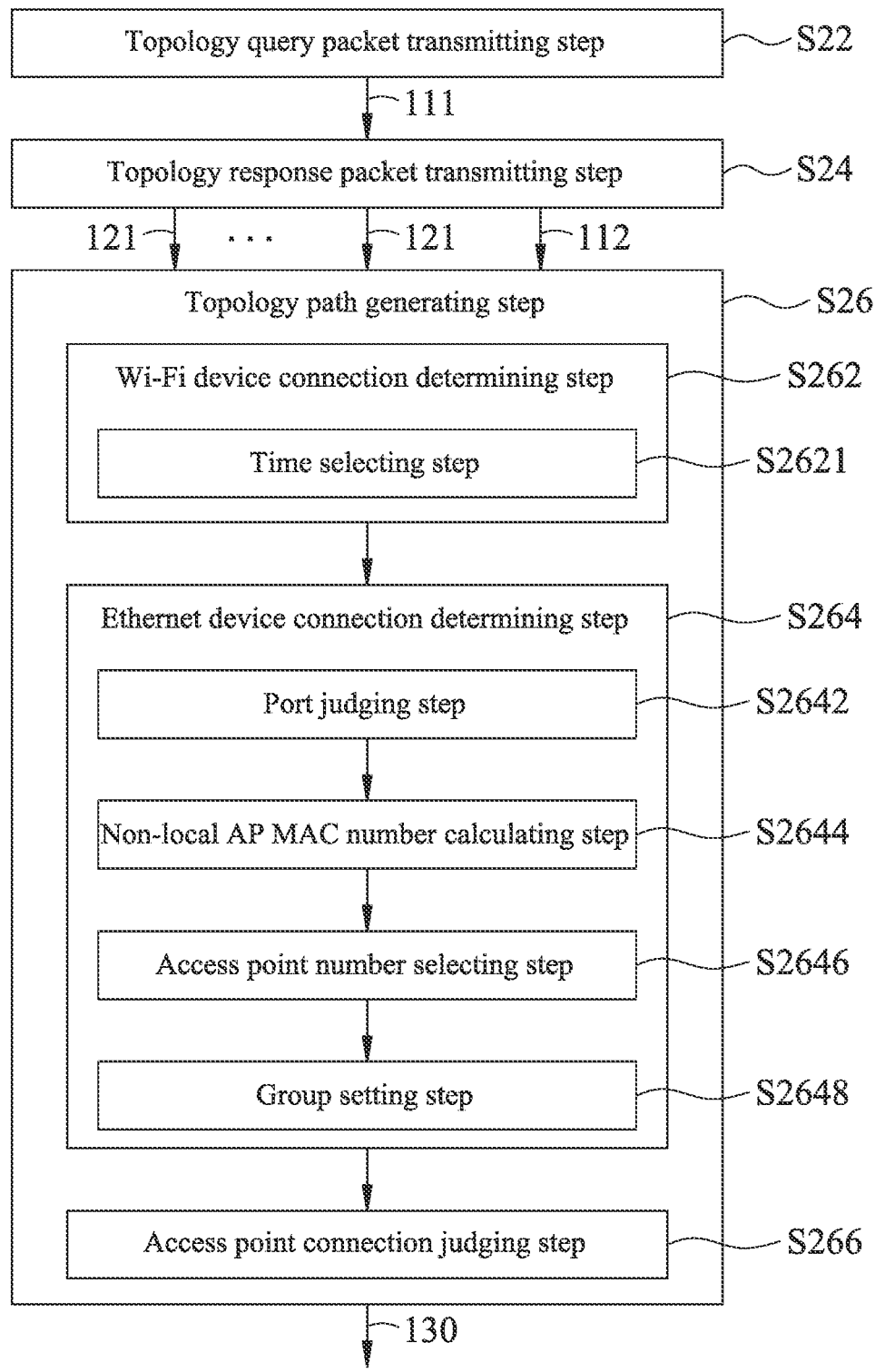
FIG. 5 shows a flow chart of a topology path obtaining method of a mesh network according to a third embodiment of the present disclosure.
Figure 6:
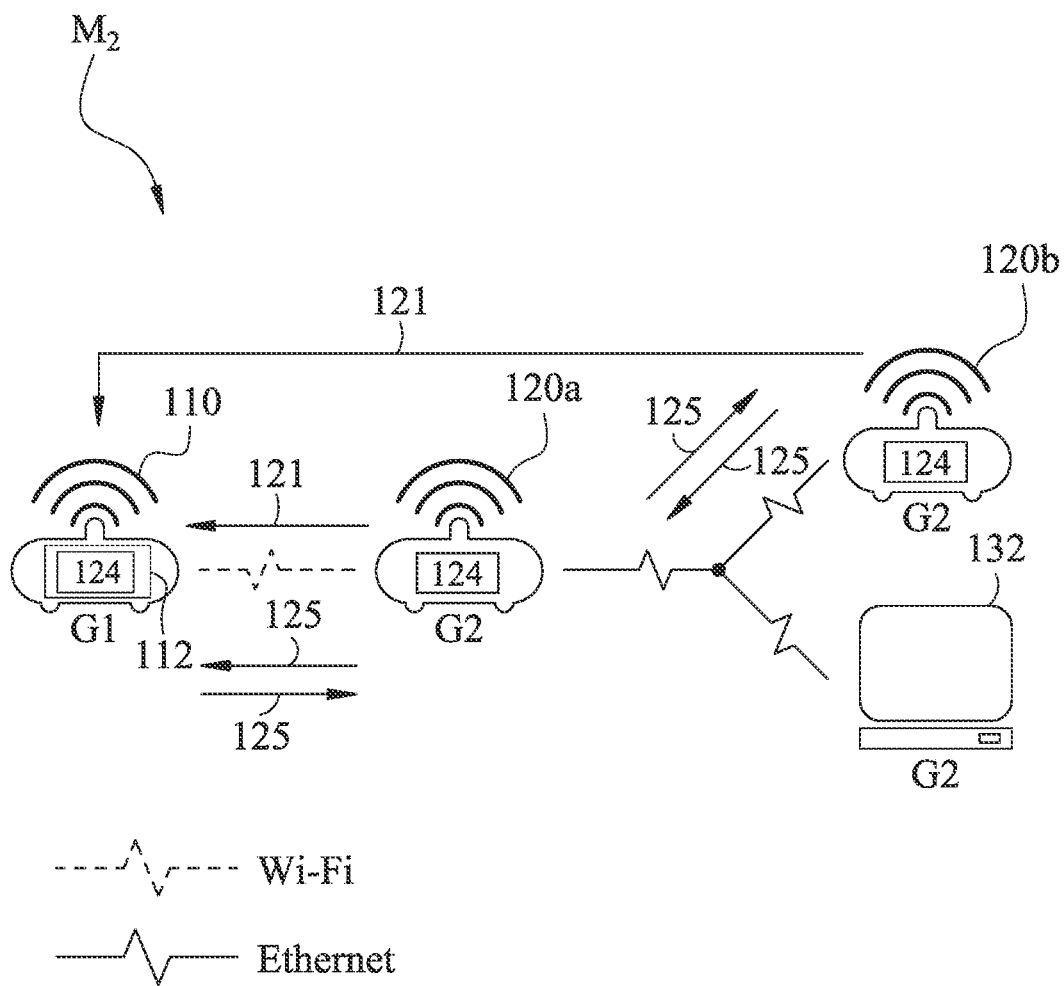
FIG. 6 is a schematic view of the mesh network of the third embodiment of the present disclosure.

Please refer to FIGS. 5 and 6. FIG. 5 shows a flow chart of a topology path obtaining method 300 of a mesh network $M_2$ according to a third embodiment of the present disclosure. FIG. 6 is a schematic view of the mesh network $M_2$ of the third embodiment of the present disclosure. As shown in FIGS. 5 and 6, the topology path obtaining method 300 of the mesh network $M_2$ includes performing a topology query packet transmitting step S22, a topology response packet transmitting step S24 and a topology path generating step S26, and is configured to obtain a topology path 130 of the mesh network $M_2$ via the above steps. The mesh network $M_2$ can include a plurality of access points and an Ethernet device 132, and the access points are composed of a root access point 110 and two extended access points 120a, 120b. The root access point 110 is configured to analyze a plurality of topology response packets, and the topology response packets are composed of the two first topology response packets 121 generated by the two extended access points 120a, 120b and the second topology response packet 112 generated by the root access point 110.

Both of the topology query packet transmitting step S22 and the topology response packet transmitting step S24 are the same as the corresponding steps in the second embodiment. The topology path generating step S26 can include performing a Wi-Fi device connection determining step S262, an Ethernet device connection determining step S264 and an access point connection judging step S266, and the Wi-Fi device connection determining step S262 can include a time selecting step S2621. Both of the Wi-Fi device connection determining step S262 and the access point connection judging step S266 are the same as the corresponding steps in the second embodiment. The Ethernet device connection determining step S264 can include performing a port judging step S2642, a non-local AP MAC number calculating step S2644 and an access point number selecting step S2646, and the aforementioned steps are the same as the corresponding steps in the second embodiment, and are not described again herein.

The difference between the third embodiment and the second embodiment is that the Ethernet device connection determining step S264 can further include performing a group setting step S2648. The group setting step S2648 is performed to configure the root access point 110 to set a plurality of group identifiers for the root access point 110, each of the extended access points 120a, 120b and the Ethernet device 132, respectively. In other words, the root access point 110 sets the group identifier for all of the access points and the client devices in the mesh network $M_2$. The root access point 110 sets two of the group identifiers, which are different, to two equipments adjacent to each other that are connected by a Wi-Fi. The root access point 110 sets two of the group identifiers, which are the same, to two equipments adjacent to each other that are connected by an Ethernet. The aforementioned equipments can be an access point or a client device.

As shown in FIG. 6, the root access point 110 and the extended access point 120a are connected by the Wi-Fi, so the root access point 110 sets its own group identifier as a number G1, and sets the group identifier for the extended access point 120a as a number G2. The extended access point 120a and the extended access point 120b are connected by the Ethernet, so the root access point 110 sets the group identifier for the extended access point 120b as the number G2 (that is, the same as the group identifier of the extended access point 120a). Specifically, the root access point 110 sets two of the group identifiers, which are the same, to the extended access point 120b and the Ethernet device 132 that are connected by the Ethernet, and the root access point 110 determines that the Ethernet device 132 is connected to the extended access point 120a with the same group identifier as the Ethernet device 132, and then the topology path 130 is thereby generated.

In detail, the extended access point 120b and the Ethernet device 132 are connected by the Ethernet, so the root access point 110 sets the group identifier of the Ethernet device 132 as the number G2. Since all of the group identifiers of the extended access point 120a, the extended access point 120b and the Ethernet device 132 are the number G2, the topology path 130 generated by the root access point 110 includes the connection relationship that the Ethernet device 132 is connected to the extended access point 120a and the extended access point 120b. It should be noted that the MAC address of the Ethernet device 132 can exist in the L2 Forwarding Tables of the root access point 110 and the two extended access points 120a, 120b at the same time. In the situation, it is impossible to determine that the Ethernet device 132 is connected to the root access point 110, the extended access point 120a or the extended access point 120b through the access point number selecting step S2646. Therefore, the group setting step S2648 of the present disclosure identifies and groups the equipments of the mesh network $M_2$ by setting the group identifiers, so that the topology map corresponding to the mesh network $M_2$ can show that the Ethernet device 132 is connected to the two extended access points 120a, 120b.

In addition, the topology response packet of each of the access points can include an ethernet neighbor access point table. As shown in FIG. 6, the two extended access points 120a, 120b are adjacent to each other and receive a topology discovery packet 125 from each other. The two extended access points 120a, 120b update the ethernet neighbor access point table 124 according to the topology discovery packet 125. In the access point connection judging step S266, the root access point 110 can judge whether the two extended access points 120a, 120b adjacent to each other are connected by the Ethernet according to the two ethernet neighbor access point tables 124 of the first topology response packets 121. Since both of the two ethernet neighbor access point tables 124 of the first topology response packets 121 contain the information that the two extended access points 120a, 120b are connected to each other by the Ethernet, the root access point 110 determines that the two extended access points 120a, 120b are connected to each other by the Ethernet. Please refer to FIG. 6 again. The root access point 110 and the extended access point 120a are adjacent to each other, and receive a topology discovery packet 125 from each other. The root access point 110 and the extended access point 120a update the ethernet neighbor access point tables 124 according to the topology discovery packet 125. The root access point 110 determines whether the root access point 110 and the extended access point 120a are connected by the Ethernet according to the ethernet neighbor access point tables 124 of the first topology response packet 121 and the ethernet neighbor access point tables 124 of the second topology response packet 112. Since the ethernet neighbor access point tables 124 of the first topology response packet 121 does not carry the information that the extended access point 120a and the root access point 110 are connected to each other by the Ethernet, and the ethernet neighbor access point tables 124 of the second topology response packet 112 also does not carry the information that the root access point 110 and the extended access point 120a are connected to each other by the Ethernet, the root access point 110 determines that the root access point 110 and the extended access point 120a are connected to each other by the Wi-Fi. Therefore, the topology path obtaining method 300 of the mesh network $M_2$ of the present disclosure can use the topology path 130 to know the connection position of the Ethernet device 132 in the topology of the mesh network $M_2$, so that the topology of the mesh network $M_2$ can be more complete. Further, the topology path obtaining method 300 of the mesh network $M_2$ can know which wireless network clients and Ethernet clients are in the topology so as to perform the debugging more conveniently in such environment.

Figure 7:
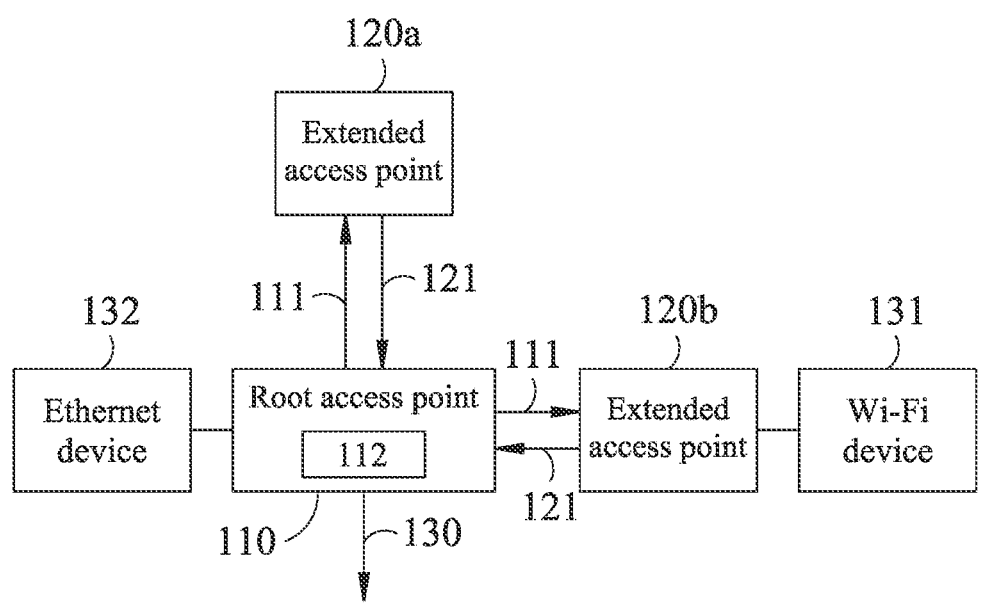
FIG. 7 shows a block diagram of a topology path obtaining system of a mesh network according to a fourth embodiment of the present disclosure.

Please refer to FIG. 7. FIG. 7 shows a block diagram of a topology path obtaining system 400 of a mesh network according to a fourth embodiment of the present disclosure. As shown in FIG. 7, the topology path obtaining system 400 of the mesh network is configured to implement the topology path obtaining method 100 of the mesh network, the topology path obtaining method 200 of the mesh network $M_1$ and the topology path obtaining method 300 of the mesh network $M_2$, and obtain a topology path 130 of the mesh network. The topology path obtaining system 400 of the mesh network includes a root access point 110, two extended access points 120a, 120b and at least one client device. A number of at least one client device is two, and the two client devices are a Wi-Fi device 131 and an Ethernet device 132, respectively. In other embodiments, the number of the extended access points can be plural, the number of the at least one client device can be plural, and the present disclosure is not limited thereto.

The root access point 110 transmits a topology query packet 111 to the two extended access points 120a, 120b. The two extended access points 120a, 120b are connected to the root access point 110, and receive the topology query packet 111. Each of the extended access points 120a, 120b transmits a first topology response packet 121 to the root access point 110 according to the topology query packet 111, and the root access point 110 generates a second topology response packet 112. The Wi-Fi device 131 is connected to the extended access point 120b, and the Ethernet device 132 is connected to the root access point 110. The root access point 110 collects and processes the two first topology response packets 121 of the two extended access points 120a, 120b and the second topology response packets 112 to generate the topology path 130. The topological path 130 includes a connection relationship between the Wi-Fi device 131 and the extended access point 120b, and a connection relationship between the Ethernet device 132 and the root access point 110.

Therefore, the topology path obtaining system 400 of the mesh network of the present disclosure uses the root access point 110 to collect the first topology response packet 121 of each of the extended access points 120a, 120b, and processes the two first topology response packets 121 and the second topology response packets 112 to generate the topology path 130, so that the topology map corresponding to the mesh network can be constructed through the topology path 130.

In summary, the present disclosure has the following advantages. First, the topology map of the mesh network with both of the Wi-Fi and the Ethernet can be presented through the topology path. Second, it is favorable to know the connection relationship among all of the access points and the client devices in the mesh network, and make the topology more complete. Third, it is favorable to perform the environmental debugging on the mesh network so as to reduce maintenance time and costs.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A topology path obtaining method of a mesh network, which is configured to obtain a topology path of the mesh network, wherein the mesh network comprises a root access point, a plurality of extended access points and at least one client device, the topology path obtaining method of the mesh network comprising:

performing a topology query packet transmitting step to configure the root access point to transmit a topology query packet to the extended access points;

performing a topology response packet transmitting step to configure each of the extended access points to transmit a first topology response packet to the root access point according to the topology query packet, and configure the root access point to generate a second topology response packet by itself; and performing a topology path generating step to configure the root access point to collect and process a plurality of the first topology response packets of the extended access points and the second topology response packet to generate the topology path;

wherein the topology path comprises a connection relationship between the at least one client device and one of the root access point and the extended access points;

wherein a number of the at least one client device is plural, the client devices comprise a Wi-Fi device and an Ethernet device, and the topology path generating step comprises:

performing a Wi-Fi device connection determining step to configure the root access point to determine that the Wi-Fi device is connected to the root access point or one of the extended access points according to the first topology response packets and the second topology response packet; and performing an Ethernet device connection determining step to configure the root access point to determine that the Ethernet device is connected to at least one of the root access point and the extended access points according to the first topology response packets and the second topology response packet.

2. The topology path obtaining method of the mesh network of claim 1, wherein the first topology response packet comprises a first non-local Access Point Media Access Control (AP MAC) number, the second topology response packet comprises a second non-local AP MAC number, and the Ethernet device connection determining step comprises:

performing a port judging step to configure each of the extended access points to judge that the Ethernet device is located at a port according to a MAC address corresponding to the Ethernet device, and configure the root access point to judge that the Ethernet device is located at another port according to the MAC address;

performing a non-local AP MAC number calculating step to configure each of the extended access points to calculate the first non-local AP MAC number according to the port, and configure the root access point to calculate the second non-local AP MAC number according to the another port; and performing an access point number selecting step to configure the root access point to select one of the root access point and the extended access points having a minimum value from a plurality of the first non-local AP MAC numbers of the first topology response packets and the second non-local AP MAC number, and determine that the Ethernet device is connected to the one of the root access point and the extended access points having the minimum value.

3. The topology path obtaining method of the mesh network of claim 2, wherein, in response to determining that at least two of the first non-local AP MAC numbers and the second non-local AP MAC number are the minimum value, the root access point determines that the Ethernet device is connected to one of the at least two of the first non-local AP MAC numbers and the second non-local AP MAC number according to hexadecimal characters corresponding to each of the at least two of the first non-local AP MAC numbers and the second non-local AP MAC number.

4. The topology path obtaining method of the mesh network of claim 1, wherein a plurality of access points are composed of the root access point and the extended access points, and the Ethernet device connection determining step comprises:

performing a group setting step to configure the root access point to set a group identifier for each of the access points;

wherein the root access point sets two of the group identifiers, which are different, to two of the access points adjacent to each other that are connected by a Wi-Fi, the root access point sets two of the group identifiers, which are the same, to two of the access points adjacent to each other that are connected by an Ethernet, and the root access point sets two of the group identifiers, which are the same, to one of the access points and the Ethernet device that are connected by the Ethernet;

wherein the root access point determines that the Ethernet device is connected to the access point with the same group identifier as the Ethernet device.

5. The topology path obtaining method of the mesh network of claim 1, wherein the first topology response packet comprises a first associate time corresponding to the Wi-Fi device, the second topology response packet comprises a second associate time corresponding to the Wi-Fi device, and the Wi-Fi device connection determining step comprises:

performing a time selecting step to configure the root access point to select one of the root access point and the extended access points having a minimum value from a plurality of the first associate times of the first topology response packets and the second associate time, and determine that the Wi-Fi device is connected to the one of the root access point and the extended access points having the minimum value.

6. The topology path obtaining method of the mesh network of claim 5, wherein a plurality of access points are composed of the root access point and the extended access points, a plurality of topology response packets are composed of the first topology response packets and the second topology response packet, each of the access points comprises a plurality of virtual access points, each of the topology response packets comprises an associate sub-time corresponding to each of the virtual access points, and the root access point selects one of the virtual access points of the access points having a minimum value from a plurality of the associate sub-times of the topology response packets and determines that the Wi-Fi device is connected to the one of the virtual access points of the access points having the minimum value.

7. The topology path obtaining method of the mesh network of claim 1, wherein the first topology response packet comprises a first response packet and a second response packet, each of the extended access points transmits the first response packet to the root access point according to a first time interval and transmits the second response packet to the root access point according to a second time interval, and the topology path generating step comprises:

performing an access point connection judging step to configure the root access point to judge a network state between each of the extended access points and the root access point according to whether the first response packet or the second response packet is received by the root access point within the first time interval;

wherein, in response to determining that the first response packet or the second response packet is received by the root access point within the first time interval, the root access point judges that the network state is a connected state;

wherein, in response to determining that neither the first response packet nor the second response packet is received by the root access point within the first time interval, the root access point judges that the network state is a disconnected state.

8. The topology path obtaining method of the mesh network of claim 7, wherein, in the access point connection judging step, one of the extended access points is in the disconnected state and records a disconnected reason code, and the one of the extended access points transmits the disconnected reason code to the root access point upon reconnecting to the root access point.

9. The topology path obtaining method of the mesh network of claim 7, wherein a plurality of access points are composed of the root access point and the extended access points, a plurality of topology response packets are composed of the first topology response packets and the second topology response packet, each of the topology response packets comprises an ethernet neighbor access point table, each two of the access points adjacent to each other receive a topology discovery packet and update the ethernet neighbor access point table according to the topology discovery packet, and the root access point judges whether each two of the access points adjacent to each other are connected by an Ethernet according to a plurality of the ethernet neighbor access point tables of the topology response packets in the access point connection judging step.

10. A topology path obtaining system of a mesh network, which is configured to obtain a topology path of the mesh network, the topology path obtaining system of the mesh network comprising:
a root access point transmitting a topology query packet;
a plurality of extended access points connected to the root access point and receiving the topology query packet, wherein each of the extended access points transmits a first topology response packet to the root access point according to the topology query packet, and the root access point generates a second topology response packet by itself; and
at least one client device connected to one of the root access point and the extended access points;
wherein the root access point collects and processes a plurality of the first topology response packets of the extended access points and the second topology response packet to generate the topology path, and the topology path comprises a connection relationship between the at least one client device and one of the root access point and the extended access points;
wherein a number of the at least one client device is plural, the client devices comprise a Wi-Fi device and an Ethernet device, the root access point determines that the Wi-Fi device is connected to the root access point or one of the extended access points according to the first topology response packets and the second topology response packet, and the root access point determines that the Ethernet device is connected to at least one of the root access point and the extended access points according to the first topology response packets and the second topology response packet.

11. The topology path obtaining system of the mesh network of claim 10, wherein the first topology response packet comprises a first non-local Access Point Media Access Control (AP MAC) number, the second topology response packet comprises a second non-local AP MAC number, each of the extended access points judges that the Ethernet device is located at a port according to a MAC address corresponding to the Ethernet device, the root access point judges that the Ethernet device is located at another port according to the MAC address, each of the extended access points calculates the first non-local AP MAC number according to the port, the root access point calculates the second non-local AP MAC number according to the another port and selects one of the root access point and the extended access points having a minimum value from a plurality of the first non-local AP MAC numbers of the first topology response packets and the second non-local AP MAC number, and the root access point determines that the Ethernet device is connected to the one of the root access point and the extended access points having the minimum value.

12. The topology path obtaining system of the mesh network of claim 11, wherein, in response to determining that at least two of the first non-local AP MAC numbers and the second non-local AP MAC number are the minimum value, the root access point determines that the Ethernet device is connected to one of the at least two of the first non-local AP MAC numbers and the second non-local AP MAC number according to hexadecimal characters corresponding to each of the at least two of the first non-local AP MAC numbers and the second non-local AP MAC number.

13. The topology path obtaining system of the mesh network of claim 10, wherein a plurality of access points are composed of the root access point and the extended access points, the root access point sets a group identifier for each of the access points, the root access point sets two of the group identifiers, which are different, to two of the access points adjacent to each other that are connected by a Wi-Fi, the root access point sets two of the group identifiers, which are the same, to two of the access points adjacent to each other that are connected by an Ethernet, the root access point sets two of the group identifiers, which are the same, to one of the access points and the Ethernet device that are connected by the Ethernet, and the root access point determines that the Ethernet device is connected to the access point with the same group identifier as the Ethernet device.

14. The topology path obtaining system of the mesh network of claim 10, wherein the first topology response packet comprises a first associate time corresponding to the Wi-Fi device, the second topology response packet comprises a second associate time corresponding to the Wi-Fi device, and the root access point selects one of the root access point and the extended access points having a minimum value from a plurality of the first associate times of the first topology response packets and the second associate time, and determines that the Wi-Fi device is connected to the one of the root access point and the extended access points having the minimum value.

15. The topology path obtaining system of the mesh network of claim 14, wherein a plurality of access points are composed of the root access point and the extended access points, a plurality of topology response packets are composed of the first topology response packets and the second topology response packet, each of the access points comprises a plurality of virtual access points, each of the topology response packets comprises an associate sub-time corresponding to each of the virtual access points, and the root access point selects one of the virtual access points of the access points having a minimum value from a plurality of the associate sub-times of the topology response packets and determines that the Wi-Fi device is connected to the one of the virtual access points of the access points having the minimum value.

16. The topology path obtaining system of the mesh network of claim 10, wherein the first topology response packet comprises a first response packet and a second response packet, each of the extended access points transmits the first response packet to the root access point according to a first time interval and transmits the second response packet to the root access point according to a second time interval, the root access point judges a network state between each of the extended access points and the root access point according to whether the first response packet or the second response packet is received by the root access point within the first time interval;
- wherein, in response to determining that the first response packet or the second response packet is received by the root access point within the first time interval, the root access point judges that the network state is a connected state;
- wherein, in response to determining that neither the first response packet nor the second response packet is received by the root access point within the first time interval, the root access point judges that the network state is a disconnected state.

17. The topology path obtaining system of the mesh network of claim 16, wherein one of the extended access points is in the disconnected state and records a disconnected reason code, and the one of the extended access points transmits the disconnected reason code to the root access point upon reconnecting to the root access point.

18. The topology path obtaining system of the mesh network of claim 16, wherein a plurality of access points are composed of the root access point and the extended access points, a plurality of topology response packets are composed of the first topology response packets and the second topology response packet, each of the topology response packets comprises an ethernet neighbor access point table, each two of the access points adjacent to each other receive a topology discovery packet and update the ethernet neighbor access point table according to the topology discovery packet, and the root access point judges whether each two of the access points adjacent to each other are connected by an Ethernet according to a plurality of the ethernet neighbor access point tables of the topology response packets.

* * * * *